Sept. 11, 1962   M. LEWINSTEIN ET AL   3,054,050
TIME-OF-OCCURRENCE TRANSMITTER
Filed Oct. 1, 1958
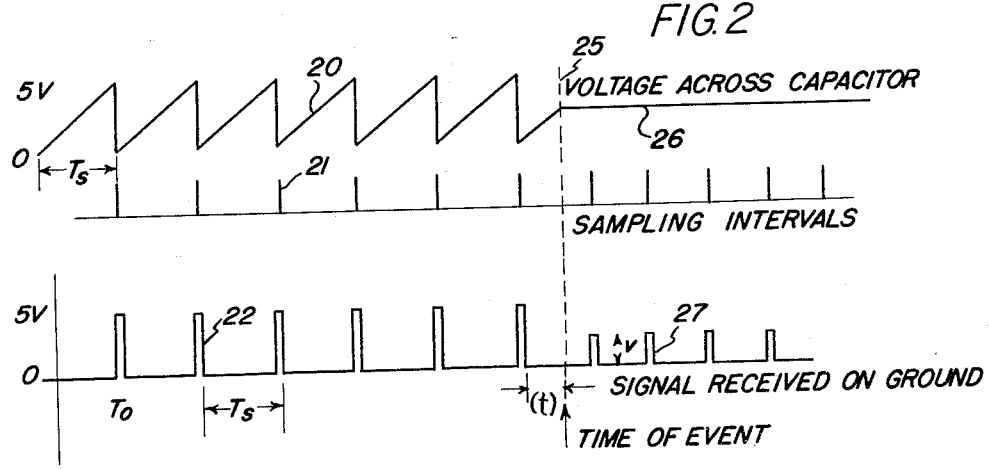
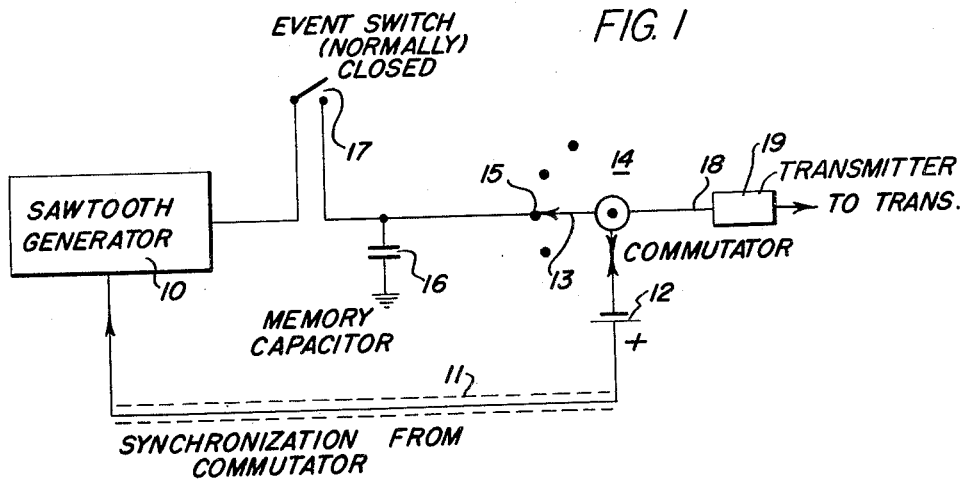
INVENTORS
MARCUS LEWINSTEIN
WILLIAM G. HARRIES
BY
ATTORNEYS

United States Patent Office 3,054,050
Patented Sept. 11, 1962

3,054,050
TIME-OF-OCCURRENCE TRANSMITTER
Marcus Lewinstein, Jamaica, N.Y., and William G. Harries, Cream Ridge, N.J., assignors, by mesne assignments, to Electro-Mechanical Research, Inc., Sarasota, Fla., a corporation of Connecticut
Filed Oct. 1, 1958, Ser. No. 764,606
8 Claims. (Cl. 324—68)

The present invention relates generally to time of occurrence markers, and more particularly to systems for measuring time with accuracy and transmitting an accurate indication of that time over a low frequency or narrow band channel, the response time of which is inadequate, per se, to provide the required accuracy.

In the course of a missile test flight, it is often necessary to know very accurately the time that a certain event takes place in respect to a reference event. This normally requires a high-frequency channel to be assigned to transmit a signal indicating the occurrence of such an event. The bandwidth of the channel would depend upon the accuracy with which the time of occurrence must be known, bandwidth requirement increasing with an increase in accuracy. Time-of-occurrence is usually related to some other event, for example the start of the test.

The present system makes it possible to measure the time of occurrence of an event to a high degree of accuracy. This is accomplished by transmitting markers whose amplitude corresponds to some time unit which is determined by sampling a time reference. The full scale of the marker pulses defines a unit of time. When the event occurs, the timing reference ceases and the amplitude of the marker becomes proportional to the time elapsed from the last full-scale marker. The time is measured by counting the number of markers plus the time that elapsed from the last full-scale marker in terms of the amplitude of the event marker. These markers are easily transmitted over a standard low-frequency channel.

Generally describing a preferred embodiment of the present invention, a linear sawtooth signal having a predetermined peak amplitude of V volts is applied to a capacitor; this sawtooth is synchronized with the sampling pulse frequency of a telemeter system in such a manner that the capacitor is sampled when the voltage is at its peak value. This signal is the basic timing marker for the measurement. The period of the sawtooth generator equals the sampling period, $T_s$ seconds.

Suppose that the sawtooth generator is connected to the capacitor through normally-closed relay contacts, or a similar device. When the event being studied occurs, the circuit will be interrupted. When the sawtooth signal is interrupted, the capacitor will be charged to the point on the rising portion of the sawtooth at which the signal was interrupted. The capacitor will hold this charge, until the next sampling. The voltage will be less than the normal full-scale peak value. Because the sawtooth is linear, the voltage on the capacitor at the time of interruption of the signal will be proportional to the time elapsed since the last sample was taken.

The capacitor is charged, when the switch is opened, to a voltage which is a fraction of V. This fraction when multiplied by the time interval between two successive samples, $T_s$ seconds, gives an interval $t$, equal to the fractional time from the beginning of a sampling period to the time of switch opening. The total time is $(NT_s+t)$ where N is the number of sampling periods.

The accuracy of the present system is determined first by the sampling rate. If the sampling rate is 30 per second, the event can immediately be timed to the nearest $\frac{1}{30}$ second.

Interval $t$ is then determined, its accuracy being dependent upon the linearity of the sawtooth and the accuracy to which the voltage of the capacitor can be read. Assuming the linearity is 5% and that voltage can be read to within 5%, $T_s$ can be read to within 10%. Thus, $t$ can be read to an accuracy of $\frac{1}{300}$ second.

It is, accordingly, a primary object of the present invention to provide a timing system capable of transmitting accurate timing signals over a narrow band channel.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram, partly in block diagram form, illustrating a system according to the present invention; and FIGURE 2 represents wave forms useful in explaining the system of FIGURE 1.

Referring now more particularly to the accompanying drawings, the reference numeral 10 denotes a sawtooth generator, which is being synchronized by voltage supplied over a lead 11 and derived from a voltage source 12, when the wiper 13 of commutator 14 arrives at a position such that a contact 15 is being contacted by the wiper 13. A condenser 16 is connected between contact 15 and ground; and a switch 17, normally closed, is connected in series between condenser 16 and the sawtooth generator 10. A lead 18 to a transmitter 19 transfers condenser voltage to the latter.

Referring to FIGURE 2 of the accompanying drawings, a linear voltage 20 is applied to the condenser 16 each time the wiper 13 wipes contact 15, the timing pulses 21 representing the synchronizing pulses, and the time between adjacent ones of the pulses 21 representing sampling intervals $T_s$ for the telemeter commutator 14.

So long as the switch 17 is closed, the condenser charges in each cycle to its full voltage, and the transmitter lead 18 is supplied with pulses 22, corresponding to the maximum condenser voltage, each time the wiper 13 passes over contact 15.

At the time, 25, of an event, and in response thereto, switch 17 is opened. Switch 17 may in practice be an electronic switch which may be responsive to a signal of predetermined amplitude representing the event to be timed. A mechanical switch is shown for purpose of simplification of the exposition of the invention.

Once switch 17 is open condenser 16 terminates its charge and discharge cycle, retaining its then existent voltage value 26. The latter value is therefore sampled thereafter by commutator 14, and the pulses 27 applied to lead 18 are accordingly thereafter of reduced amplitude.

It will be noted that the cadence of the transmitted pulses is not disturbed by the time measuring process, and that only the relative amplitudes of pulses 22 are changed. This change does not involve or require a channel of greater bandwidth than is required by the sampling pulses, in any event.

Time elapsed from the last full scale pulse may be calculated from the known amplitudes of the received pulses of reduced amplitude by means of $$t=\frac{A_1}{A_2}T_s$$

where $A_1$ is the amplitude of pulses 27 and $A_2$ the amplitude of pulses 22, $T_s$ being the sampling interval.

Upon reclosure of switch 17 the transmitted pulses will again attain full amplitude, and upon re-opening of switch 17 a further event will be timed, the system being useful to time a large number of transient events over a long time period.

While I have described and illustrated one specific embodiment of the present invention, it will become apparent that variations of the specific details of construction may be resorted to without departing from the true spirit and scope of the invention as defined in the appended claims.

What is claimed is:

1. A timing system for timing the occurrence of an event comprising a linear sawtooth voltage source, a two terminal condenser, a normally closed circuit maker connected between said sawtooth voltage source and one terminal of said condenser, a commutator having a contact connected to said one terminal of said condenser, the remaining terminal of said condenser being grounded, whereby said condenser is periodically charged linearly to a predetermined voltage, said commutator including a wiper, means for synchronizing the operation of said wiper and the sawtooth voltage, a transmitter responsive to said commutator and the voltage of said condenser for transmitting sampling pulses having amplitudes representative of said voltage of said condenser, whereby the relative amplitudes of pulses time-wise straddling said event represents said timing.

2. The method of measuring the time of occurrence of an event which comprises generating a periodically sawtooth voltage wave of fixed peak value, varying the charge on a condenser in response to the variations of said sawtooth voltage wave, causing the varying of charging of the condenser to cease upon the occurrence of said event and transmitting pulses whose amplitudes are a direct function of the charges on said condenser both at the occurrence of said event and of each of said peak values.

3. The method of claim 2, including further the step of synchronizing the generation of said sawtooth wave with the occurrence of a maximum charge on said condenser.

4. The method of measuring the time of occurrence of a random event which comprises generating a periodically sawtooth wave, accordingly and continuously varying the stored signal in a storing means in response to the variations of said sawtooth wave, causing the variation of the stored signal in said storage means to cease upon the occurrence of said random event, and thereafter preserving the stored signal in said storage means, and generating samples of the stored signal in said storage means at predetermined substantially uniform long time intervals for relatively short times both preceding and following said random event.

5. The method in accordance with claim 4 and including the step of transmitting pulses whose amplitudes are direct functions of said samples.

6. The method in accordance with claim 4 including the step of synchronizing the repetition of the sawtooth wave in correspondence with the initiations of said predetermined intervals.

7. A system for timing a random event, comprising a condenser, a source of periodically, repetitively, linearly varying voltage having a constant predetermined peak value normally connected for charging said condenser, thereby producing corresponding voltage changes across said condenser, means for terminating the voltage changes of said condenser in response to said random event and for thereafter maintaining the voltage of said condenser as it exists on operation of said means for terminating and following said random event, and means for repetitively sampling the peak voltage of said condenser both following said random event and preceding said random event, said means for sampling being synchronized with said source of periodically repetitively linearly varying voltage.

8. A timing system, comprising a condenser, means for periodically and repetitively sampling the voltage of said condenser both preceding and following a random event, means synchronized with said means for sampling for periodically and at equal time intervals linearly varying the charge of said condenser to a predetermined range of values once for the duration of each sampling, and means for instantaneously terminating the charging of said condenser upon the occurrence of said random event.

References Cited in the file of this patent
UNITED STATES PATENTS

| | | |
|---|---|---|
| 2,301,197 | Bradford | Nov. 10, 1942 |
| 2,377,969 | Richter | June 12, 1945 |
| 2,511,868 | Newsom | June 20, 1950 |
| 2,589,085 | Houghton | Mar. 11, 1952 |
| 2,704,364 | Summers | Mar. 15, 1955 |
| 2,878,426 | Preli | Mar. 17, 1959 |